United States Patent [19]

Wallace

[11] Patent Number: 4,696,401
[45] Date of Patent: Sep. 29, 1987

[54] CUSHIONING PACKAGING MEDIA

[75] Inventor: Robert S. Wallace, 823 S. Longwood, Los angeles, Calif. 90005

[73] Assignees: Robert S. Wallace, Los Angeles; Jack Bauman, Pacific Palisades, both of Calif. ; a part interest

[21] Appl. No.: 869,670

[22] Filed: Jun. 2, 1986

Related U.S. Application Data

[63] Continuation-in-part of Ser. No. 744254, Jun. 13, 1985, Pat. No. 4,592,468.

[51] Int. Cl.⁴ .................. B65D 81/10; B65D 81/16
[52] U.S. Cl. ............................. 206/594; 206/5; 206/387; 206/591
[58] Field of Search ............... 206/387, 523, 585–594, 206/521, 5; 217/27, 35, 52; 220/435, 436, 448

[56] References Cited

U.S. PATENT DOCUMENTS

| | | | |
|---|---|---|---|
| D. 213,157 | 1/1969 | Wallace . | |
| 2,689,079 | 9/1954 | Timer | 206/591 |
| 2,769,534 | 11/1956 | Lidgard | 206/587 |
| 2,860,768 | 11/1958 | Smithers | 206/523 |
| 3,200,943 | 8/1965 | Waterbury | 206/523 |
| 3,273,779 | 9/1966 | Mykleby | 206/523 |
| 3,495,787 | 2/1970 | Wallace . | |
| 3,584,738 | 6/1971 | Wallace . | |
| 3,604,556 | 9/1971 | Schwartz | 206/387 |
| 3,613,871 | 10/1971 | Evans | 206/387 |
| 3,627,113 | 12/1971 | Di Iola | 206/387 |
| 3,664,492 | 5/1972 | Wallace . | |
| 3,669,820 | 6/1972 | Fredericks | 206/585 |
| 3,752,384 | 8/1973 | Siburn | 206/593 |
| 3,773,272 | 11/1973 | Wallace . | |
| 3,856,235 | 12/1974 | Wallace . | |
| 3,918,920 | 11/1975 | Barber | 206/591 |
| 3,980,221 | 9/1976 | Okada | 206/586 |
| 4,071,065 | 1/1978 | Halbich | 206/591 |
| 4,126,246 | 11/1978 | Galer | 206/586 |
| 4,241,829 | 12/1980 | Hardy | 206/328 |
| 4,406,369 | 9/1983 | Wallace . | |

FOREIGN PATENT DOCUMENTS

| | | | |
|---|---|---|---|
| 0002416 | 5/1979 | European Pat. Off. | 206/523 |
| 0086542 | 8/1983 | European Pat. Off. | 206/387 |
| 2462361 | 3/1981 | France | 206/521 |
| 0363614 | 9/1962 | Switzerland | 206/523 |
| 1310508 | 3/1973 | United Kingdom | 206/523 |

*Primary Examiner*—Stephen Marcus
*Assistant Examiner*—Jimmy G. Foster
*Attorney, Agent, or Firm*—William W. Haefliger

[57] ABSTRACT

A packaging medium comprises:
 (a) a flexible support wall, and
 (b) fins integral with that wall to project generally toward a structure to be packaged, to confine same during such packaging,
 (c) the fins being resiliently and yieldably deflectible to bend relative to the support wall in response to squeezing relatively toward the structure,
 (d) the fins extending in generally parallel planes and having terminal edges that define a positioning plane relative to which the fin planes are out of perpendicularity.

13 Claims, 23 Drawing Figures

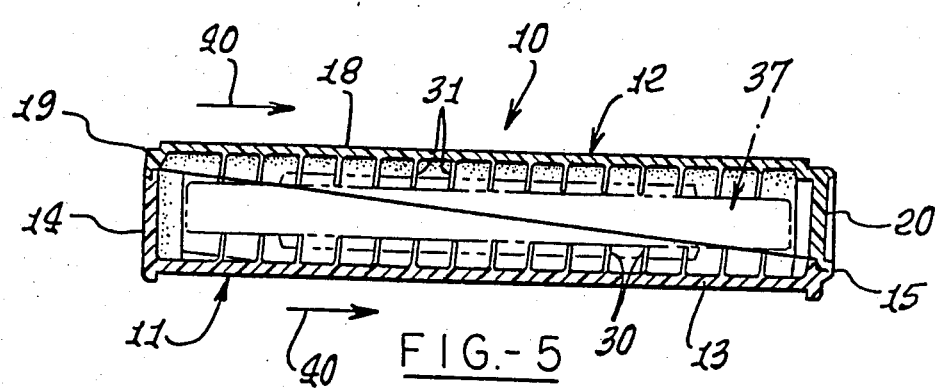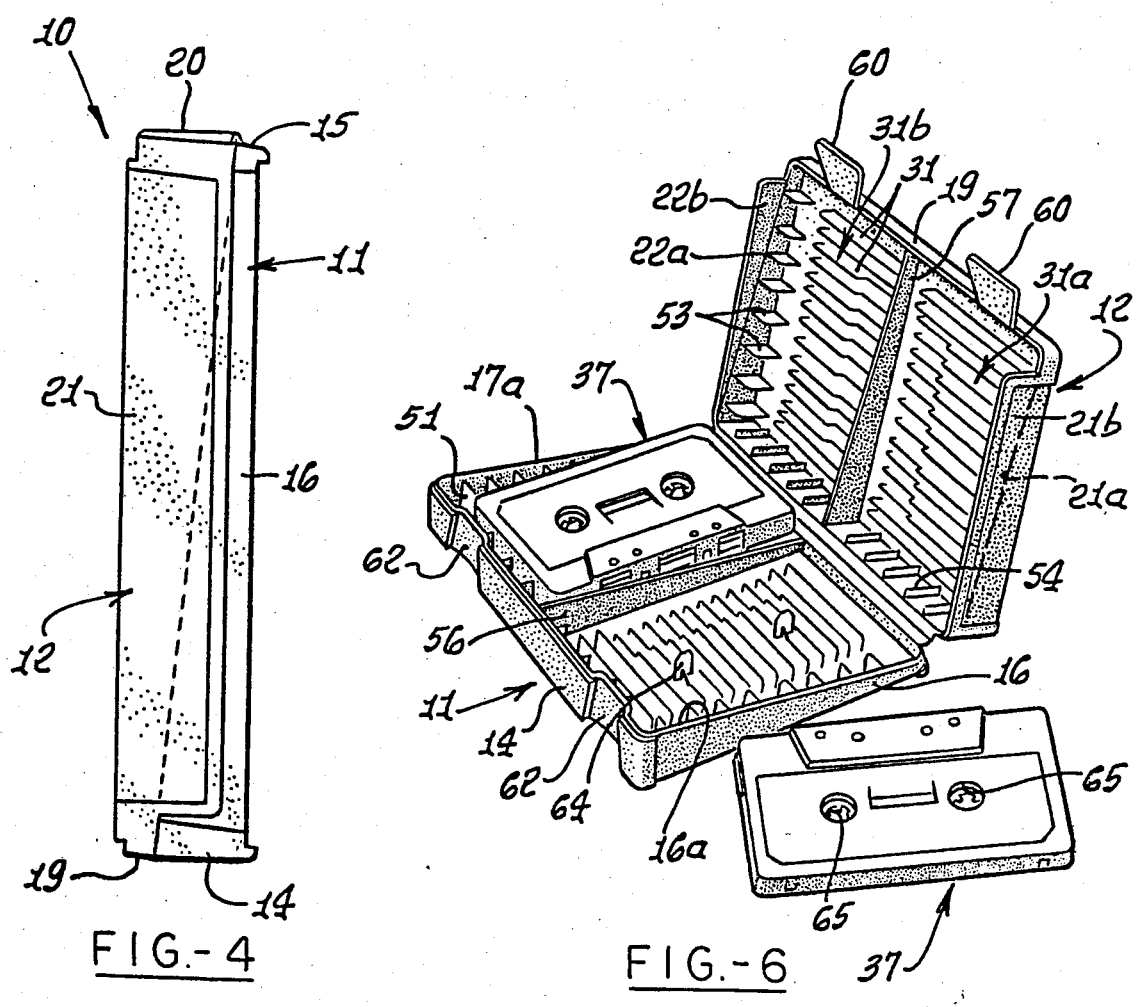

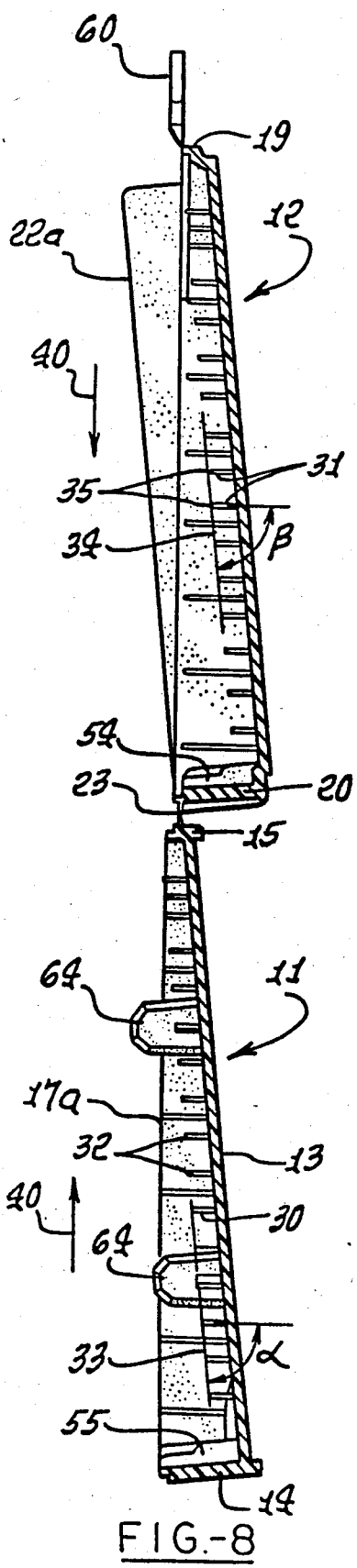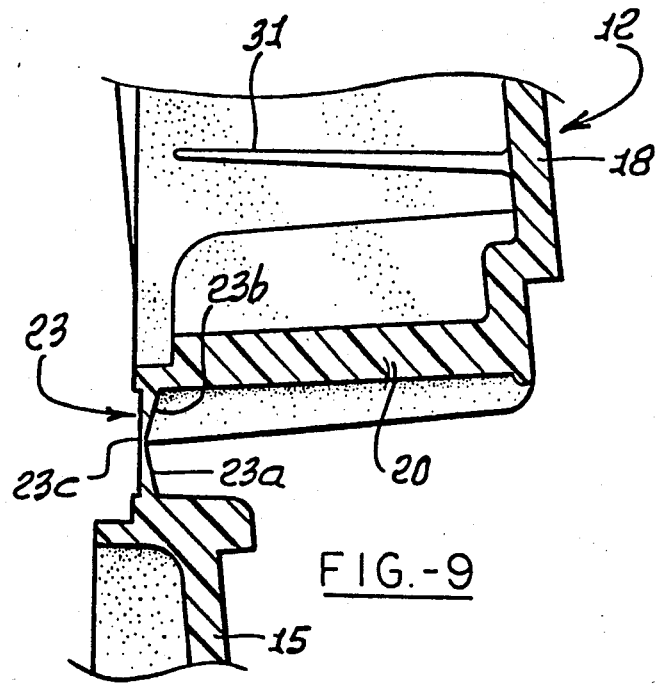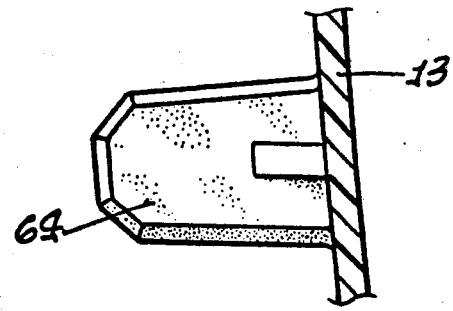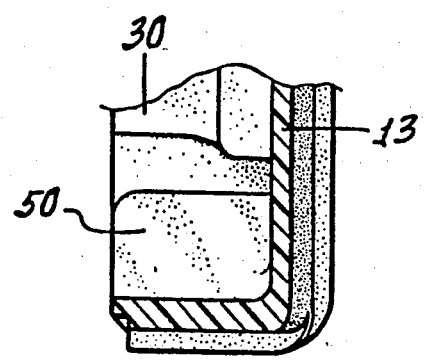
FIG.-8
FIG.-9
FIG.-10
FIG.-11

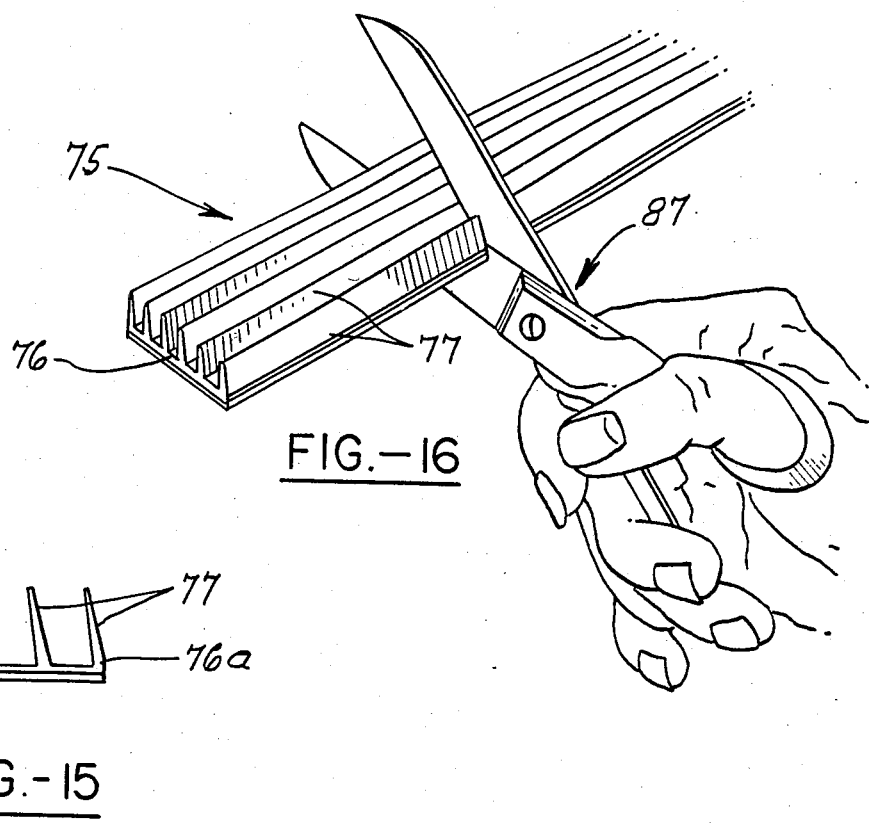
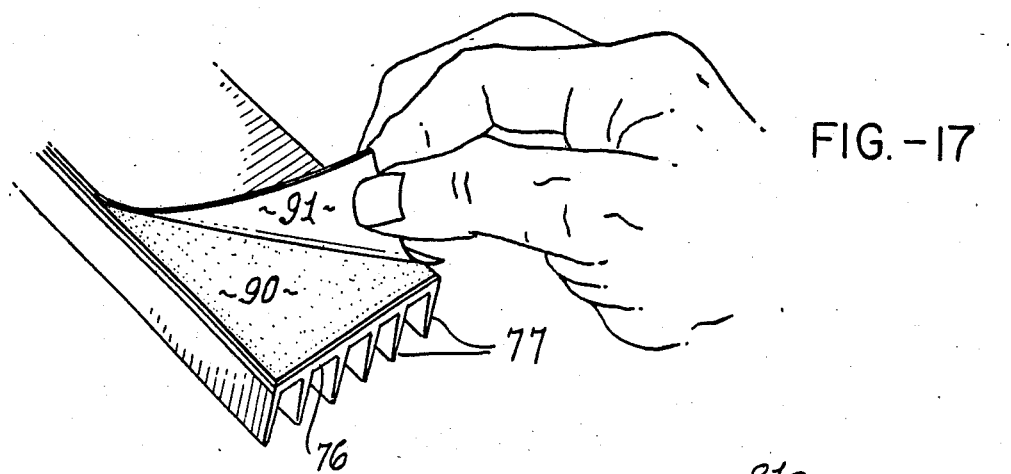
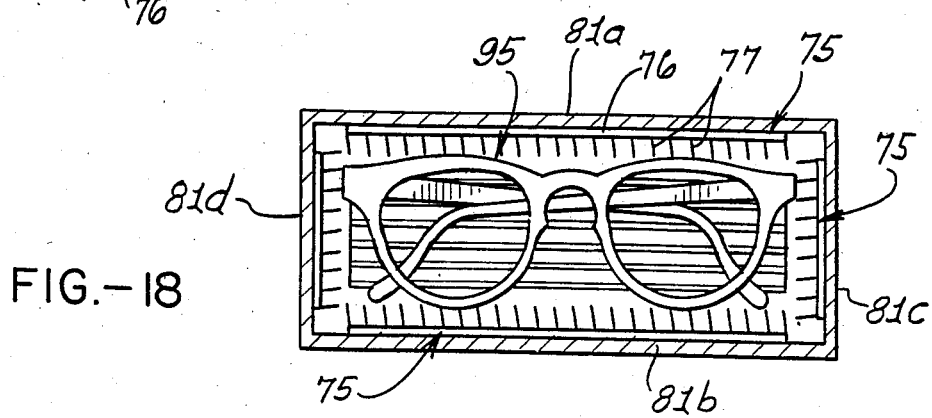

FIG.—22
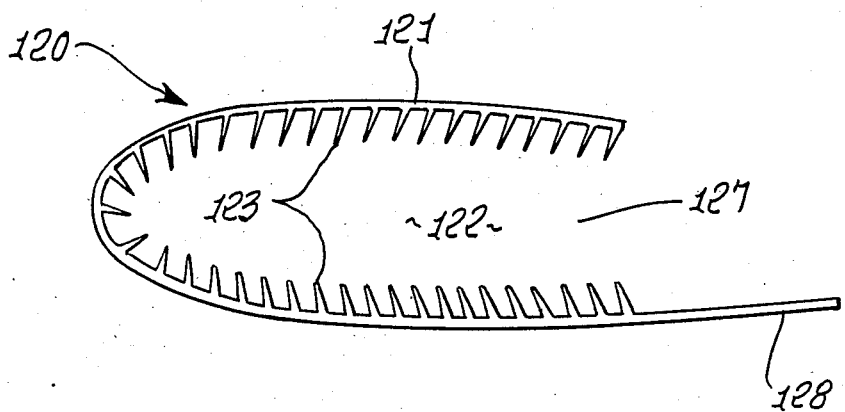
FIG.—23
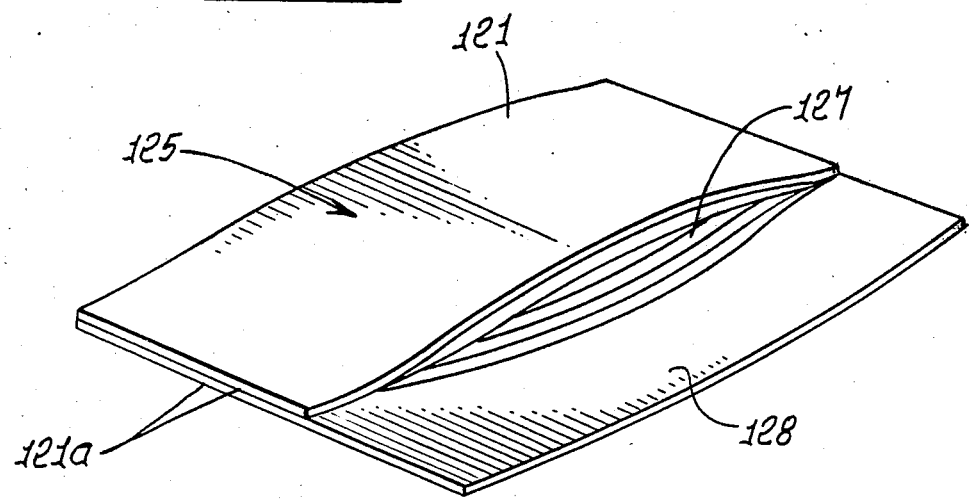

CUSHIONING PACKAGING MEDIA

BACKGROUND OF THE INVENTION

This application is a continuation-in-part of my application Ser. No. 744,254, filed June 13, 1985 now U.S. Pat. No. 4,592,468.

This invention relates generally to packaging to firmly retain articles in packaged position, more particularly it concerns a simple, rugged, article positioning medium that is easily molded as a one-piece unit.

There is a continuing need for positioning means for articles requiring stability within containers, such as shipping containers to protect the articles against damage due to shock loading, in transport. For example, magnetic tape cassettes and other electronic equipment require such stability and protection against shock loading, there being many other examples of articles requiring stability in containers. Prior containers and positioning media have not, however, possessed the unusual advantages in construction, mode of operation and results as now afforded by the present invention. Examples of prior media include expanded plastic nodules, which are very difficult to handle; and bubble forming plastic sheets which are not resiliently compressible, as the herein invention.

SUMMARY OF THE INVENTION

It is a major object of the invention to provide an improved packing material or media meeting the above needs, and characterized by simplicity of construction in a one-piece, molded unit.

Basically, the material comprises:

(a) a flexible support wall, and (b) fins integral with that wall to project generally toward a structure to be packaged, to confine same during such packaging, (c) the fins being resiliently and yieldably deflectible to bend relative to the support wall in response to squeezing relatively toward the structure, (d) the fins extending in generally parallel planes and having terminal edges that define a positioning plane relative to which said fin planes are out of perpendicularity.

As will be seen, the fins may advantageously extend in generally parallel relation to deflect correspondingly in response to squeezing, and may be spaced apart in series across major extent of the support wall; they may have length, substantially exceeding their widths; and they may consist of readily cuttable material so that the media may be shaped to fit a wide range of articles and containers.

It is a further object of the invention to provide a container having structure therein to be positioned, together with the fins and support wall therefor in the container, the fins squeezed between said structure and a wall of the container so that the fins are resiliently bent.

It is a further object to provide first fins with terminal edges defining a first article positioning plane relative to which the first fins are out of perpendicularity, and to provide second fins with terminal edges defining a second article positioning plane relative to which the second fins are out of perpendicularity, such first and second planes being substantially parallel, for example. Typically, the first fins extend at angles between 75° and 88° relative to said first plane, and the second fins extend at angles between 75° and 88° relative to the second plane.

As referred to, the packaged article may comprise a magnetic tape cartridge or other articles (as for example electronic equipment, glasses, etc.) having side thereof compressively engaged by deflected edges defined by the fin means; the first fins may include one or more first fin sections, and said second fins may define one or more second fin sections, there being one or more such articles, one article having sides compressed by deflected fins of a first fin section and a second fin section, and another article having sides thereof compressively engaged by deflected fins of another first fin section and another second fin section, as will appear. Accordingly, a protective, compact, one-piece container for multiple tape cartridges or other articles, is provided.

These and other objects and advantages of the invention, as well as the details of an illustrative embodiment, will be more fully understood from the following specification and drawings, in which:

DRAWING DESCRIPTION

FIG. 4 is an end elevation on lines 4—4 of FIG. 1;

FIG. 5 is a section on lines 5—5 of FIG. 1;

FIG. 6 is a perspective view of the FIG. 1 container, in open condition;

FIG. 8 is a section, in elevation taken on lines 8—8 of FIG. 7;

FIG. 9 is an enlarged fragmentary section taken on lines 9—9 of FIG. 7;

FIG. 10 is an enlarged fragmentary section taken on lines 10—10 of FIG. 7;

FIG. 11 is an enlarged fragmentary section taken on lines 11—11 of FIG. 7;

FIG. 15 is an end view showing packaging media in accordance with the invention;

FIG. 16 is a perspective view showing the FIG. 15 media subjected to cutting to size;

FIG. 17 is a perspective view showing use and selective exposure of adhesive backing on the packaging media of FIG. 15;

FIG. 18 is a section in elevation showing use of the packaging material in a container;

FIG. 22 is a section showing a modification; and

FIG. 23 is a perspective view showing a pouch incorporating the invention.

DETAILED INVENTION

Figure 1:
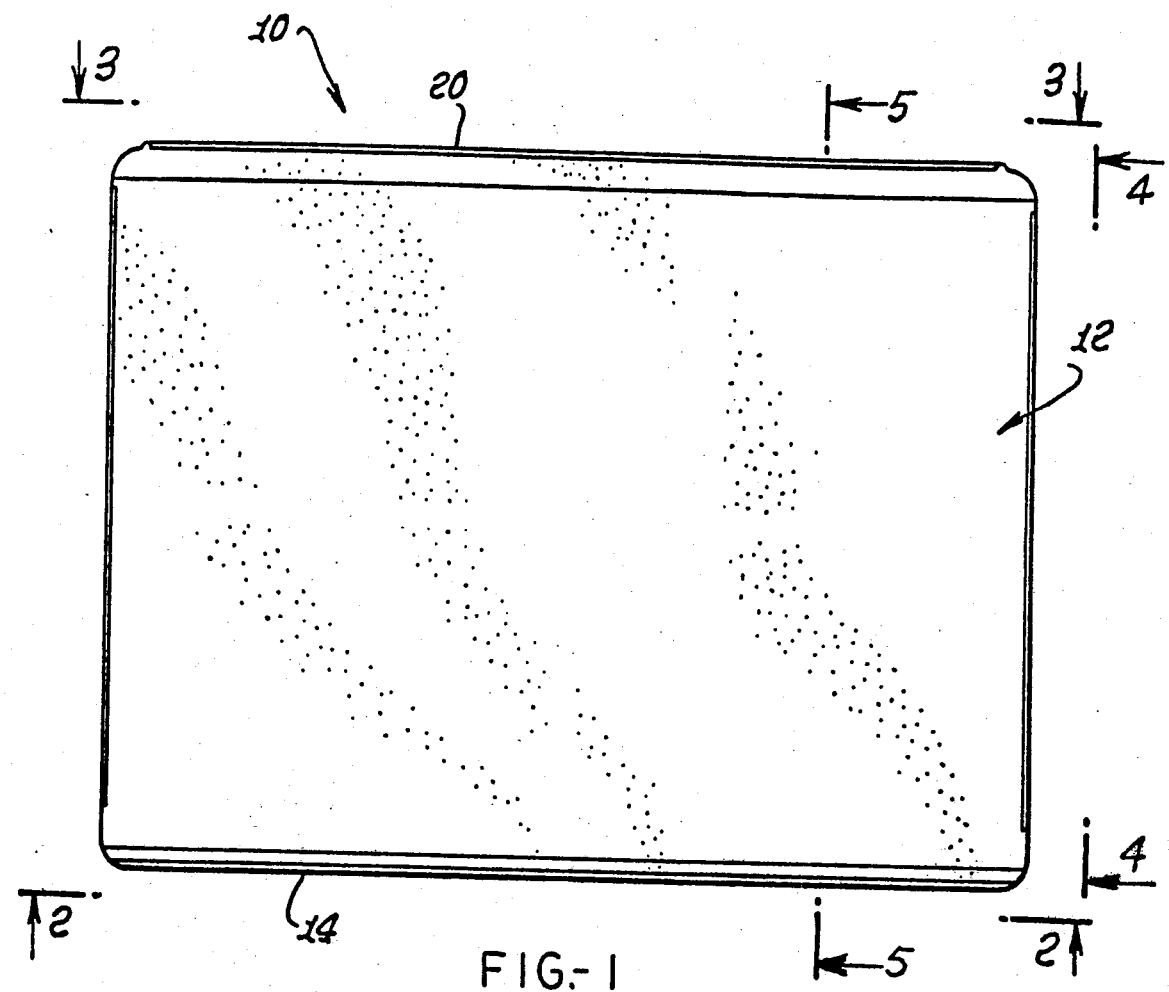
FIG. 1 is a top plan view of a closed container incorporating the invention.
Figure 2:
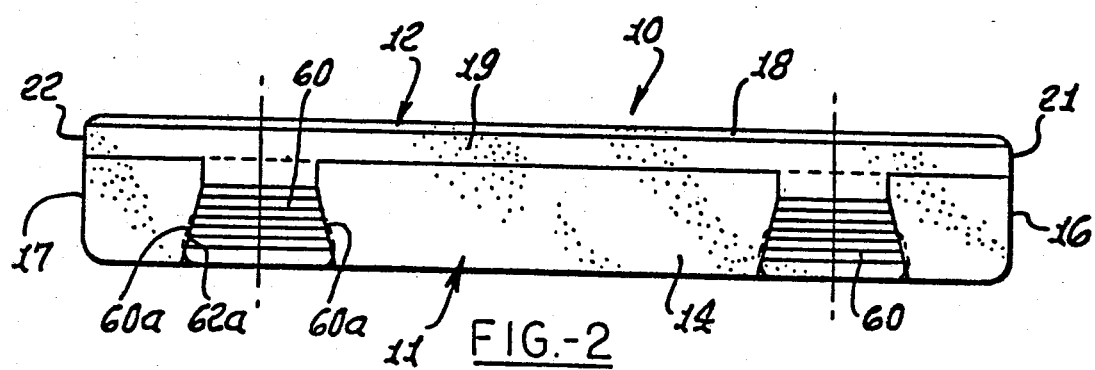
FIG. 2 is a side elevation taken on lines 2—2 of FIG. 1.
Figure 3:
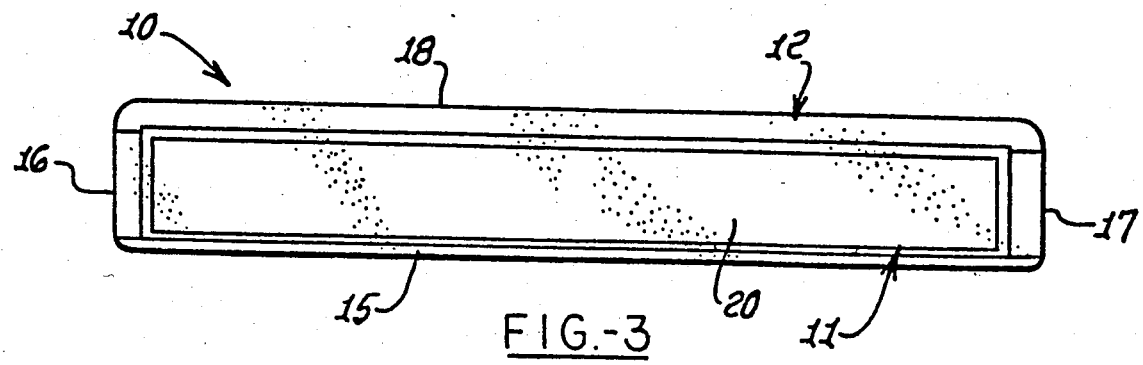
FIG. 3 is a side elevation taken on lines 3—3 of FIG. 1.
Figure 7:
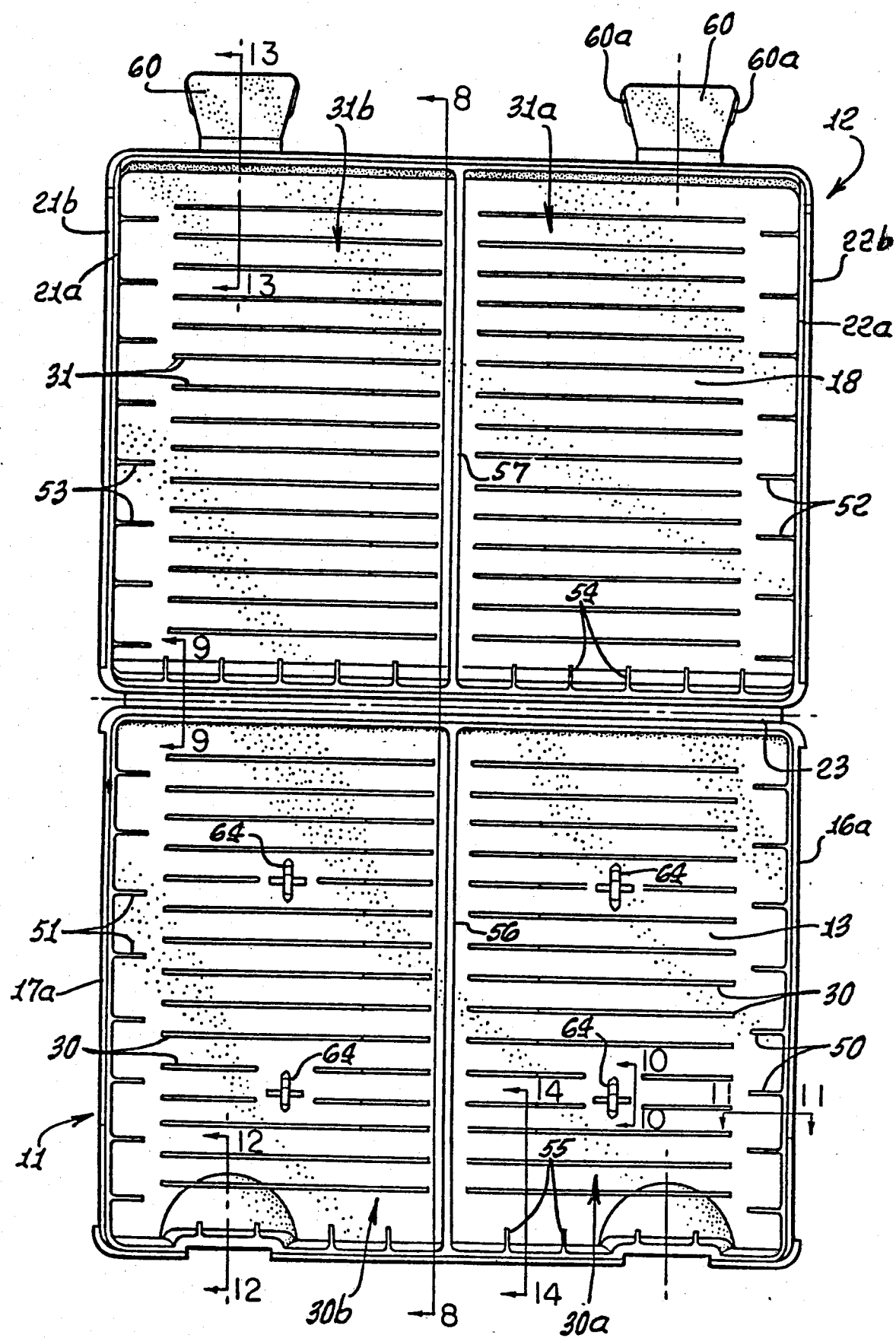
FIG. 7 is a plan view showing the interior of the receptacle and cover of the opened container.

In the drawings, the container 10 comprises a receptacle 11 and a cover 12 therefor; the receptacle has a bottom wall 13, opposite longitudinally spaced side walls 14 and 15, and opposite laterally spaced end walls 16 and 17; and the cover has a top wall 18, opposite side walls 19 and 20, and opposite end walls 21 and 22. The container and cover are typically have one-piece, molded plastic construction, with intergrally molded hinge 23 interconnect walls 15 and 20, as is clear from FIGS. 8 and 9, and it has two tapered extents 23a and 23b, with their thinnest extents interconnected at 23c. The hinge is elongated in a lateral direction, parallel to walls 15 and 20.

Figure 12:
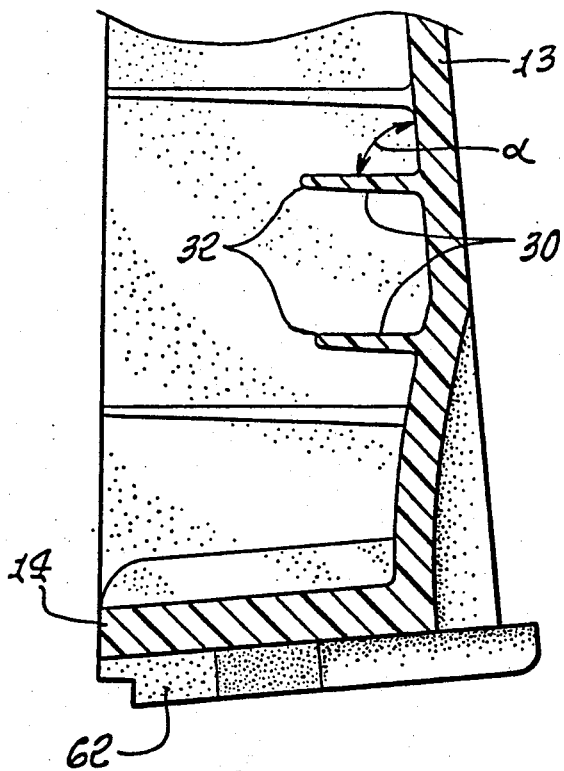
FIG. 12 is an enlarged fragmentary section taken on lines 12—12 of FIG. 7.
Figure 13:
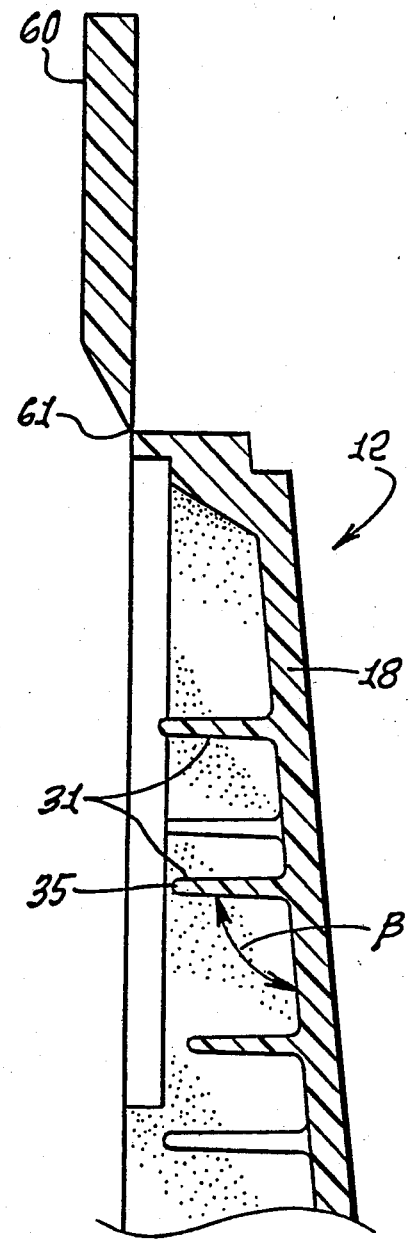
FIG. 13 is an enlarged fragmentary section taken on lines 13—13 of FIG. 7.
Figure 14:
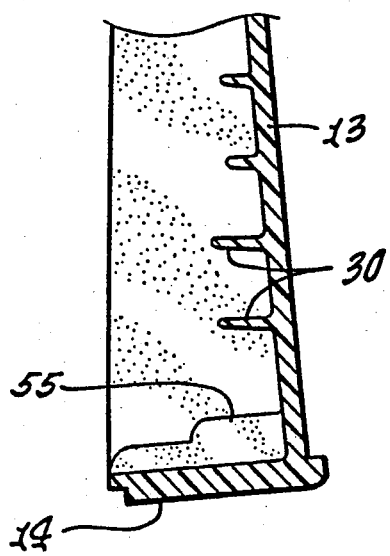
FIG. 14 is an enlarged fragmentary section taken on lines 14—14 of FIG. 7.

Fin means are provided to be integral with at least one of the top and bottom walls 18 and 13, and to project toward the other of such walls to engage an article placed within the container and between the walls when the cover is closed onto the receptacle, the fin means being yieldably deflectible in response to squeezing of the article between the walls. In the example, the fin means include first fins 30, provided in two sections 30a and 30b, integral with one wall, such as receptacle bottom wall 13; and second fins 31, provided in two sections 31a and 31b, integral with the one wall, such as cover top wall 18. The first fins 30 extend in parallel, or substantially parallel, planes, and have terminal edges 32 that define an article positioning plane, or planes 33, relative to which the first fins are slightly out of perpendicularity; thus, the fins extend in lateral, upright parallel planes that extend at an angle $\alpha$, between 75° and 88° relative to plane 33; and the second fins 31 also extend in lateral, upright, parallel planes that extend at an angle or angles $\beta$ between 75° and 88° relative to an article positioning plane 34 defined by their terminal edges 35—i.e. fins 31 are slightly out of perpendicularity relative to plane 34. Such fins typically taper toward their edges, as is clear from FIGS. 12 and 13, to enhance their flexibility, near such edges, which typically engage and position the retained and positioned article, as for example a magnetic tape cassette container an example of which is seen at 37 in FIGS. 5 and 6. Note also that the fins extend at correspondingly slight angles $\alpha$ and $\beta$ relative to the planes of walls 13 and 18, the article extending parallel to those walls (see FIG. 5).

The receptacle, furthermore, has depth that gradually diminishes, relative to its fin height, in one longitudinal direction (see arrow 40 in FIGS. 5 and 8); and the cover has depth that also gradually increases relative to its fin height in that direction 40, in closed condition of the receptacle and cover. This enables the fin arrangement combination, as shown and described, in a highly compact container, with yieldably article cushioning and positioning fins. Note in this regard, the tapering end walls 16 and 17 with tapering edges 16a and 17a, and tapering end walls 21 and 22 with tapering edges 21a and 22a. End walls 21 and 22 also are extended at 21b and 22b to overlap the outer side of the walls 16 and 17, to provide protective closure.

Also provided are flexible auxiliary fins 50 and 51 in the receptacle, and 52 and 53 in the cover, proximate the tapered end walls as described, to position the edges of the article 37, and to slightly (flex) yield if necessary, to cushion the article nested therebetween. See also auxiliary fins 54 and 55 proximate walls 20 and 14, respectively, having similar functions. All of such fins 50–55 project toward edges of the nested and positioned article 37. Dividers 56 and 57 separate the fin sections 30a and 30b, and the sections 31a and 31b, respectively, and maintain separation of side-by-side articles 37, as seen in FIG. 6.

Finally, fastener means is associated with the receptacle and cover to hold the cover closed on the receptacles with the article squeezed by the fins, and thereby positioned with the fin means in deflected state. The fastener means advantageously may comprise interfitting tongue and groove elements, one on the cover and the other on the receptacle. See for example, the integral flat plastic tongue 60 having integral, folding hinge connections at 61 to the cover wall (see FIG. 13), and the grooves 62 defined by and in receptacle wall 14. The tongues and grooves are shown to have interfitting wedge shape, to retain the cover closed on the receptacle, yet allow ready pull-out of the tongues or tabs, from closed, flush positions, when the cover is to be opened. See tapered edges 60a of the tongue, and tapered walls 62a of the grooves. Upstanding projections 64 integral with the receptacle wall 13 interfit the cassette reel hubs 65, to block rotation of the hubs, preventing loosening of the magnetic tape.

Figure 19:
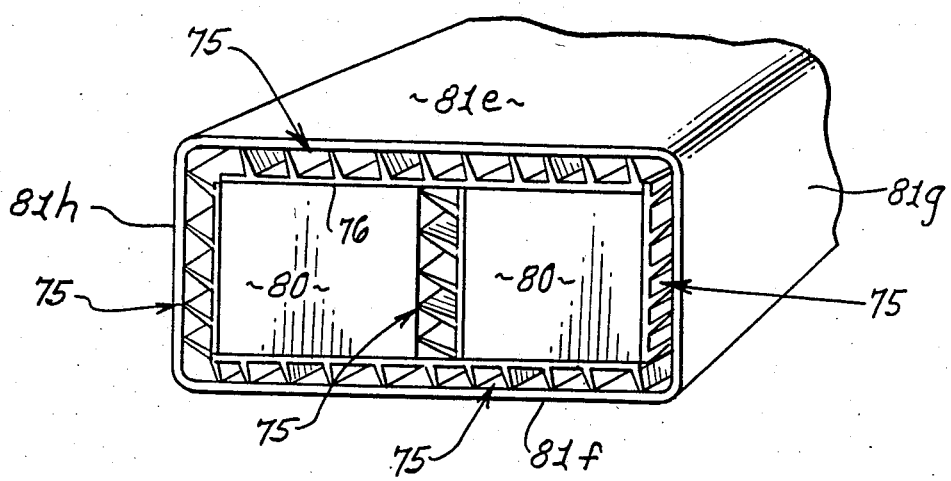
FIG. 19 is a section showing another use of the material, in a container.

Referring now to FIGS. 15 and 17, packaging material 75 includes a support wall 76, and fins 77 integral with that wall at their inner ends 77a, the material 75 being unitary. The wall and fins may consist of molded polyethylene; and the fins project outwardly from the wall 76, as toward a structure to be packaged, to confine the structure during packaging. FIG. 18 shows one form of such structure, i.e. eyeglasses 78; and FIG. 19 shows another form of structure such as a plastic box 80 for electronic equipment therein. In FIG. 19, the fins may be considered as projecting toward structure 80, even though wall 76 is closer to the structure than the fins.

Figure 20:
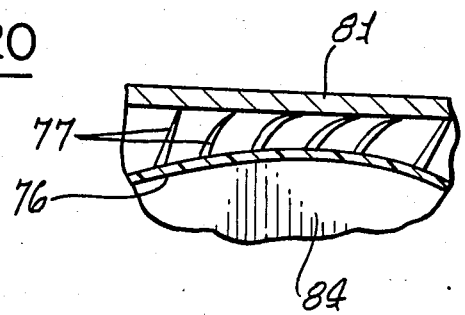
FIG. 20 is a fragmentary elevation showing variable flexing of the packaging material, conforming to a non-linear article, in a container.

The elongated fins extend at angles $\alpha$ relative to the plane of wall 76, as described previously; also, they typically taper outwardly away from that wall, so that their outermost extents are more readily resiliently and yieldably flexible, in bending relative to wall 76 in response to squeezing during packaging, i.e. between a container wall 81, and packaged structure 84 as seen in FIG. 20 for example. Note in that view that wall 76 bends to conform to the surface curvature or contour of the structure 84.

The fins extend in generally the same direction, lengthwise along the wall 76, and they have terminal outer edges that define a positioning plane relative to which the fins are out of perpendicularity. See for example the positioning plane defined by the outer edges of the fins 77 in FIG. 20, adjacent the container wall 81. It is clear that the article 84 is firmly supported with cushioning effect by the variably flexed fins 77 in that view.

Figure 21:
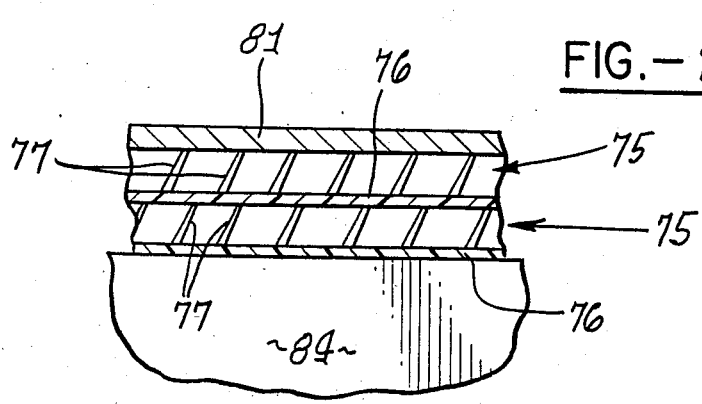
FIG. 21, is a view like FIG. 20 showing multiple

In FIG. 16, a scissors 87 is shown cutting the media 75 to selected length, in a cutting plane extending crosswise of the elongated fins, and the cut media may thus be shaped to fit into any size container, to fit an article therein, as in FIG. 20. FIG. 21 shows two such media, each including a support wall and fins as described, the two media having been cut to size and stacked into the container between the container wall 81 and the contained article 84, to support the latter with cushioning effect. Thus, the invention is accomodated to different size gaps between the article to be shipped and the container wall.

Additional features include the provision of media with fin lengths substantially exceeding fin widths, as shown; fin widths which are substantially equal as shown in FIG. 15, or wherein fin widths progressively decrease, as described previously.

FIG. 17 shows the provision of adhesive backing material, as in a layer 90 on the side of wall 76 opposite the fins. The adhesive may be exposed as by peeling off a cover layer 91, whereby the adhesive may be applied to the article 84, or the container wall 81 (in FIG. 20, for example), or to the adjacent media fin tips, as in FIG. 21. Layer 90 is attached to the wall 76, in any suitable manner, so that adhesive is presented outwardly.

FIG. 18 shows multiple sections of media 75 laid about the eyeglasses (the container article) 95, with fins 77 closer to the article than to the container walls 81a–81d.

The eyeglasses are typically completely surrounded by the media 75, for final packaging.

FIG. 19 is similar; however, the fins in that view are closer to container walls 81e–h) than to the contained articles 80. One media strip 75 extends between the two articles.

FIG. 21 is a section 120 showing a cuttable or flexible support wall 121 having U-shape and defining an interior space 122 toward which and into which fins 123 extend, as shown. Space 122 is adapted to receive an article to be protectively confined, in contact with the fins. The wall and fins have the same construction as in FIGS. 15 and 16. FIG. 22 shows a pouch 125 at least in part defined by wall 121 as shown in FIG. 21. Wall edges 121a may be sealed together as shown. The pouch defines an inlet as also indicated at 127 in FIG. 21, and the pouch has a fold-over tab 128 for closing the inlet.

I claim:

1. For use in packaging a structure, the combination with and including said structure comprising:
    (a) a container and an associated interior support wall, said structure located within the container, and
    (b) solid fins integral and one piece with said wall and projecting generally toward said structure at different sides thereof and to confine same during said packaging,
    (c) said fins being resiliently and yieldably deflectable to bend relative to said support wall in response to squeezing relatively toward said structure, said support wall and fins consisting of readily cuttable plastic material,
    (d) said fins extending in generally the same direction along said wall and having terminal edges that define a positioning plane relative to which said fins are out of perpendicularity,
    (e) the fins extending in substantially parallel relation and at an angle α relative to the plane defined by the wall, the fins tapering outwardly away from that wall and toward fin terminals, said angle α being between about 70° and 88°,
    (f) the fins squeezed between said structure and the support wall so that the fins are resiliently bent and to varying extents, the support wall being flexible.

2. The combination of claim 1 wherein said fins are spaced apart in series sequence, along the support wall.

3. The combination of claim 1 wherein said fins extend lengthwise along said support wall and widthwise away from said support wall, the fin lengths substantially exceeding the fin widths.

4. The combination of claim 3 wherein the fin widths are substantially equal.

5. The combination of claim 3 wherein the widths of successive fins are decreased.

6. The combination of claim 1 including adhesive backing on said support wall at the side thereof opposite said fins.

7. The combination of claim 1 wherein said support wall consists of flexible plastic material.

8. The combination of claim 1 wherein said structure within the container is solid.

9. The combination of claim 1 wherein said support wall has U-shape to define an interior space toward which and into which the fins extend.

10. For use in packaging a structure, the combination with and including said structure comprising:
    (a) a container and an associated interior support wall, said structure located within the container, and
    (b) solid fins integral and one piece with said wall and projecting generally toward said structure at different sides thereof and to confine same during said packaging,
    (c) said fins being resiliently and yieldably deflectible to bend relative to said support wall in response to squeezing relatively toward said structure, said support wall and fins consisting of readily cuttable plastic material,
    (d) said fins extending in generally the same direction along said wall and having terminal edges that define a positioning plane relative to which said fins are out of perpendicularity,
    (e) the fins extending in substantially parallel relation and at an angle α relative to the plane defined by the wall, the fins tapering outwardly away from that wall and toward fin terminals, said angle α being between about 70° and 88°,
    (f) the fins squeezed between said structure and the support wall so that the fins are resiliently bent and to varying extents, the supoprt wall being flexible,
    (g) the fins spaced apart in series along the support wall which is flexed.

11. For use in packaging a structure, the combination with and including said structure comprising:
    (a) a container and an associated interior support wall, said structure located within the container, and
    (b) solid fins integral and one piece with said wall and projecting generally toward said structure at different sides thereof to confine same during said packaging,
    (c) said fins being resiliently and yieldably deflectible to bend relative to said support wall in response to squeezing relatively toward said structure, said support wall and fins consisting of readily cuttable plastic material,
    (d) said fins extending in generally the same direction along said wall and having terminal edges that define a positioning plane relative to which said fins are out of perpendicularity,
    (e) the fins extending in substantially parallel relation and at an angle α relative to the plane defined by the wall, the fins tapering outwardly away from that wall and toward fin terminals, said angle α being between about 70° and 88°,
    (f) and including a second support wall and fins integral therewith, in stacked relation with the first mentioned fins and support wall.

12. For use in packaging a structure, the combination with and including said structure, comprising:
  (a) a container in the form of a pouch and an associated interior support wall, said structure located within the container,
  (b) solid fins integral and one piece with said wall and and projecting toward said structure at different sides thereof and to confine same during said packaging,
  (c) said fins being resiliently and yieldably deflectible to bend relative to said support wall in response to squeezing relatively toward said structure, said support wall and fins consisting of readily cuttable plastic material,
  (d) said fins extending in generally the same direction along said wall and having terminal edges that define a positioning plane relative to which said fins are out of perpendicularity,
  (e) the fins extending in substantially parallel relation and at an angle $\alpha$ relative to the plane defined by the wall, the fins tapering outwardly away from that wall and toward fin terminals, said angle $\alpha$ being between about 70° and 88°,
  (f) the support wall defining a portion of said pouch.

13. The combination of claim 12 wherein the pouch defines an inlet along one side thereof, and includes a fold over tab for closing said inlet.

* * * * *